(12) United States Patent
Hammond et al.

(10) Patent No.: US 10,509,410 B2
(45) Date of Patent: Dec. 17, 2019

(54) EXTERNAL CONTROL OF AN AUTONOMOUS VEHICLE

(71) Applicant: Zoox, Inc., Menlo Park, CA (US)

(72) Inventors: Marcus Hammond, Mountain View, CA (US); Marc Wimmershoff, San Jose, CA (US); Timothy David Kentley-Klay, Stanford, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 15/833,695

(22) Filed: Dec. 6, 2017

(65) Prior Publication Data

US 2019/0171218 A1   Jun. 6, 2019

(51) Int. Cl.
G05D 1/02 (2006.01)
B60W 30/09 (2012.01)
G05D 1/00 (2006.01)

(52) U.S. Cl.
CPC .......... *G05D 1/0223* (2013.01); *B60W 30/09* (2013.01); *G05D 1/0011* (2013.01); *G05D 1/0214* (2013.01); *G05D 1/0276* (2013.01); *B60W 2520/10* (2013.01); *B60W 2550/10* (2013.01)

(58) Field of Classification Search
USPC .......................................................... 701/2
See application file for complete search history.

(56) References Cited

U.S. PATENT DOCUMENTS

| 6,078,849 A * | 6/2000 | Brady | B60T 7/22 |
| | | | 180/167 |
| 8,229,618 B2 | 7/2012 | Tolstedt et al. | |
| 8,849,494 B1 | 9/2014 | Herbach et al. | |
| 9,121,703 B1 * | 9/2015 | Droz | G01C 3/08 |
| 9,308,917 B2 * | 4/2016 | Oh | B60W 30/16 |
| 9,317,774 B2 * | 4/2016 | Villien | G05D 1/0234 |
| 9,612,123 B1 * | 4/2017 | Levinson | G01C 21/32 |
| 9,754,490 B2 * | 9/2017 | Kentley | G06K 9/00805 |
| 2006/0293856 A1 * | 12/2006 | Foessel | B60W 30/09 |
| | | | 701/301 |
| 2015/0151725 A1 * | 6/2015 | Clarke | B60W 30/00 |
| | | | 701/28 |
| 2015/0234382 A1 * | 8/2015 | Ju | G01S 7/003 |
| | | | 701/23 |

(Continued)

FOREIGN PATENT DOCUMENTS

| KR | 20160144829 | 12/2016 |
| RU | 2014147069 | 6/2016 |

OTHER PUBLICATIONS

The PCT Search Report and Written Opinion dated Apr. 11, 2019, for PCT Application No. PCT/US/2018/064014, 9 pages.

*Primary Examiner* — Tyler D Paige
(74) *Attorney, Agent, or Firm* — Lee & Hayes, P.C.

(57) ABSTRACT

Remote controlling of a vehicle, such as an autonomous vehicle, may sometimes be more efficient and/or reliable. Such control, however, may require processes for ensuring safety of surrounding persons and objects. Aspects of this disclosure include using onboard sensors to detect objects in an environment and alter remote commands according to such objects, e.g. by reducing a maximum permitted velocity of the vehicle as a function of distance to detected objects. In some examples described herein, such remote controlling may be performed by using objects in the environment as control objects, with movements of the control objects resulting in movement of the vehicle.

20 Claims, 8 Drawing Sheets

(56) References Cited

U.S. PATENT DOCUMENTS

| | | | | |
|---|---|---|---|---|
| 2016/0180197 | A1* | 6/2016 | Kim | G01S 5/16 |
| | | | | 382/103 |
| 2016/0291134 | A1* | 10/2016 | Droz | G01S 7/4802 |
| 2016/0358453 | A1* | 12/2016 | Wassef | G08B 25/016 |
| 2017/0120902 | A1* | 5/2017 | Kentley | B60W 10/04 |
| 2017/0120904 | A1* | 5/2017 | Kentley | G01C 21/32 |
| 2017/0206426 | A1* | 7/2017 | Schrier | B60W 50/00 |
| 2017/0285637 | A1* | 10/2017 | Salinger | G05D 1/0027 |
| 2017/0297568 | A1* | 10/2017 | Kentley | G06F 3/1454 |
| 2017/0305418 | A1* | 10/2017 | Bae | B60W 50/0098 |
| 2018/0004223 | A1* | 1/2018 | Baldwin | B60W 30/18154 |
| 2018/0239359 | A1* | 8/2018 | Jian | G01C 21/3484 |
| 2018/0284284 | A1* | 10/2018 | Curatu | G01S 17/10 |
| 2018/0292529 | A1* | 10/2018 | Hogasten | G01S 17/023 |

\* cited by examiner

EXTERNAL CONTROL OF AN AUTONOMOUS VEHICLE

BACKGROUND

Vehicles are increasingly supplementing or replacing manual functionality with automatic controls. Semi-autonomous vehicles may assist a driver with some functionalities, e.g., collision avoidance and braking, while fully-autonomous vehicles may reduce all passengers to passive participants as they are shuttled to their destination. This increased automation may make tasks common to conventional vehicles more difficult. For example, the absence of a steering wheel in some implementations may make navigating the vehicle in congested or unmapped areas, e.g., parking garages or maintenance or production facilities, more difficult.

DETAILED DESCRIPTION

Figure 1:
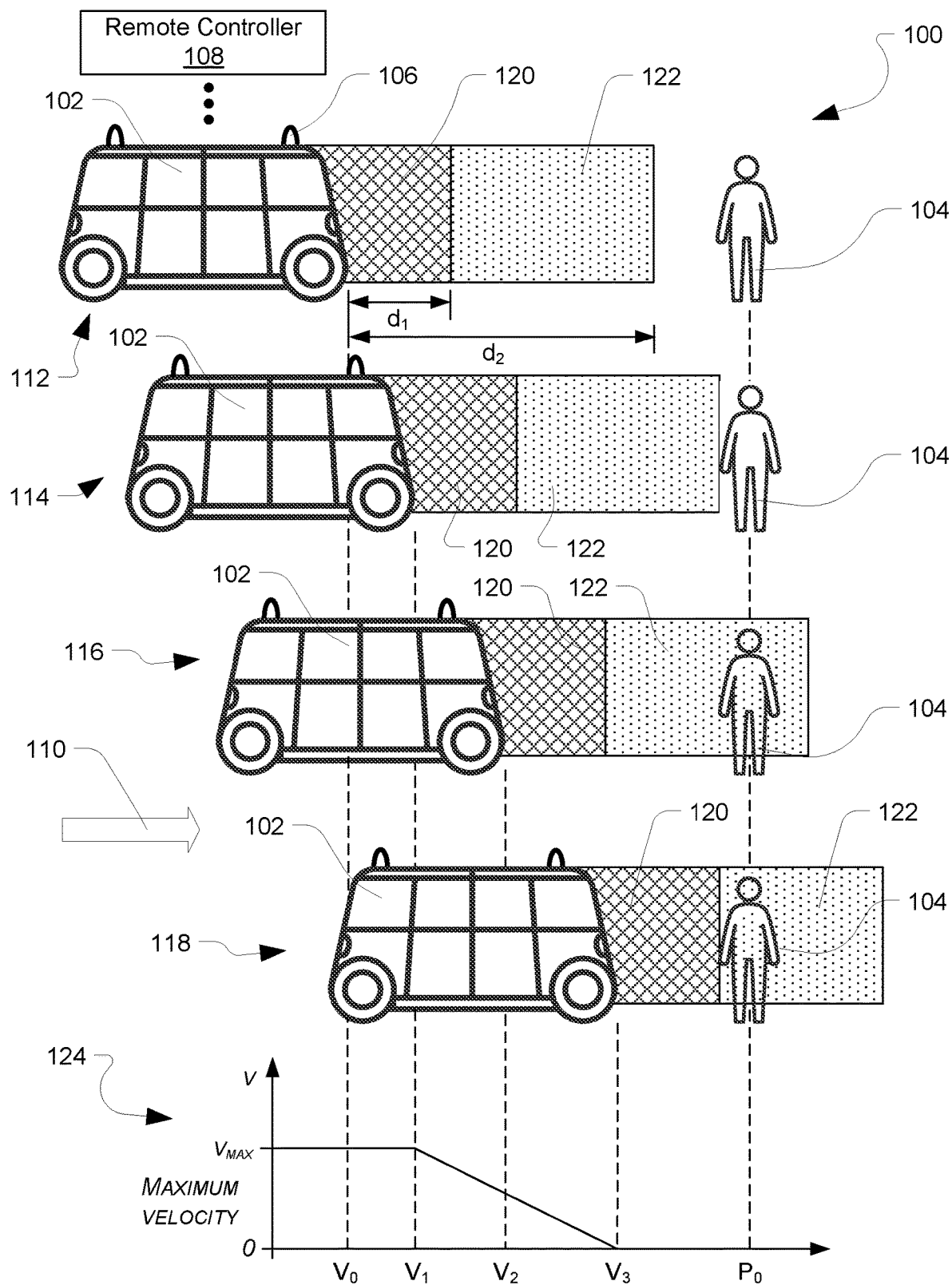
FIG. 1 illustrates an example of external control of an autonomous vehicle according to aspects of this disclosure.

The following detailed description is directed to systems and processes for controlling an autonomous vehicle in an environment. As a brief example, unlike conventional automobiles, some autonomous vehicles may not be readily controlled by a passenger. By way of non-limiting example, some autonomous vehicles may not have onboard navigation controls, e.g., steering wheels, transmission controls, acceleration controls and/or braking controls. However, there may be instances in which it is desirable to navigate the vehicle manually or in an on-demand manner. For example, when the vehicle is in a particularly congested or unmapped area, such as a parking garage or a service location, it may be more expedient to allow for manual control of the vehicle. As a non-limiting example, a technician may need to accurately move the autonomous vehicle into an area for charging and/or repair.

According to implementations of this disclosure, external control of an autonomous vehicle may be carried out using a remote controller communicating with a receiver on the autonomous vehicle. Moreover, sensors disposed on the autonomous vehicle may be used to ensure safe operation of the vehicle while it is remotely controlled. For instance, the sensors may be used to identify objects in the environment and prohibit the vehicle from advancing within a predetermined distance of those objects. In other embodiments of this disclosure, the sensors may be configured to recognize a specific object in the environment, such as a person, and determine an input for controlling the autonomous vehicle based on the recognized object. In one example, a person's proximity to a vehicle may cause the vehicle to move a specific distance or to a specific location. These and other examples will be described below in more detail.

In some implementations of this disclosure, the vehicle may receive command signals indicating a direction and/or speed at which the vehicle should proceed. The vehicle may determine the presence of an object proximate the vehicle, and depending upon the distance and/or position of the object relative to the vehicle, the vehicle may be controlled according to the command signals, i.e., to proceed in the direction at the speed, or according to alternative command signals, e.g., to proceed at a slower speed than the commanded speed or to ignore the command signals altogether. The alternative command signals may be used to prevent inadvertent contact of the vehicle with the object, for example.

In other implementations of this disclosure, the vehicle may interpret a position of an object as a command signal. For instance, the vehicle may determine the presence of an object, such as a person, proximate the vehicle and may move away from the object. For example, as a person approaches the vehicle, the vehicle may move in a direction and/or distance to maintain a distance and/or orientation relative to the person. In further implementations of this disclosure, the vehicle may maintain a predetermined distance between the vehicle and an object by moving closer to the object. For instance, when sensor information indicates that a control object, such as a person, has moved away from the vehicle, the vehicle may move in a direction and/or at a distance to maintain a distance and/or orientation relative to the person.

In some example implementations in which a position and/or motion of an object is interpreted as a control command, the object may first be authenticated as a control object. For instance, the object or a device associated with the object may be authenticated by the vehicle, e.g., using a wireless protocol. In other implementations, a person or device may be recognized by the autonomous vehicle as an entity capable of controlling the autonomous vehicle.

Features and methods described herein may be used by a system, such as an autonomous drone, a fully- or semi-autonomous vehicle system, or some other system for assisting in manual navigation, including for collision avoidance. Other uses for the systems and methods described herein may also be apparent to those having ordinary skill in the art with the benefit of this disclosure. These and other features and implementations are described in more detail below, with reference to FIGS. 1-8.

Turning to FIG. 1, an autonomous vehicle 102 and a person 104 are present in an environment 100. According to implementations of this disclosure, the autonomous vehicle 102 may be a Level 5 autonomous vehicle, such that each of the seats is a passenger seat, i.e., there is no dedicated driver seat because the autonomous vehicle is completely autonomous. The Level 5 classification was issued in 2016 by the U.S. National Highway Traffic Safety Administration, and describes a vehicle capable of performing all safety critical functions for the entire trip, with the driver (or occupant) not being expected to control the vehicle at any time. In that case, since the vehicle may be configured to control all functions from start to stop, including all parking functions, it may be unoccupied. This is merely an example, and the systems and methods described herein may be incorporated into any ground-borne vehicle, also including conventional automobiles in which all vehicular control is performed by a driver and vehicles that are partially autonomously controlled, such that they can be autonomously controlled without driver attention or assist during certain driving conditions, such as, for example, while operating on limited-access highways. Such partially autonomously controlled vehicle may require driver attention and/or assistance during other driving conditions, such as, for example, while operating on city streets in urban areas, or during at least some parking functions.

The example vehicle 102 may include a chassis or frame, and a body disposed on the frame. The body may provide the vehicle with any configuration, such as, for example, a van, a sport utility vehicle, a cross-over vehicle, a truck, a bus, an agricultural vehicle, a construction vehicle, etc. The vehicle 102 may be powered by one or more internal combustion engines, one or more electric motors, any combination thereof, and/or any other suitable power sources. In addition, the example vehicle 102 may include any number of wheels, tires, and/or tracks, such as, for example, four wheels.

The vehicle 102 may also include a number of vehicle sensors 106 that sense objects proximate the vehicle, such as in the environment 100. In some examples, the vehicle sensors 106 may include sensors configured to identify objects in the environment 100. The vehicle sensors 106 may include, for example, one or more light detection and ranging sensors (LIDAR), one or more cameras (RGB, grey scale (intensity), stereo, depth, infrared, etc.), one or more radio detection and ranging sensors (RADAR), one or more ultrasonic transducers, one or more microphones for sensing sounds in the environment, and other sensors capable of sensing objects. The autonomous vehicle 102 may also include other sensors for other purposes, including but not limited to a speed sensor, sensors related to operation of internal combustion engines and/or electric motors, sensors related to the tires to detect tire temperature, tire pressure, and tread depth, and/or brake-related sensors for detecting brake temperatures and/or wear, and in vehicles having regenerative braking, sensors for detecting parameters related to operation of the regenerative braking system. The vehicle sensors 106 may also include, for example, wheel encoders, inertial measurement units (IMUs), accelerometers, magnetometers, and gyroscopes. The vehicle sensors 108 may be configured to provide sensor data representative of the sensed objects, such as the person 104 and signals to systems associated with the autonomous vehicle 102. Other types of sensors and sensor data are contemplated.

In some implementations, information from the sensors may be used by a perception system associated with the autonomous vehicle 102 to understand attributes of the environment and/or to act on those attributes. For example, during normal operation of the autonomous vehicle 102, attributes of the environment may be used to control movement of the autonomous vehicle, e.g., to change a trajectory of the autonomous vehicle. For example, a controller in the autonomous vehicle may control the autonomous vehicle to avoid a detected object, e.g., by controlling the steering, acceleration and/or braking of the autonomous vehicle 102. However, in some instances, normal operational controls of the vehicle may not be available and or may not be practical. For instance, the perception system that navigates the vehicle around an object may be reliant upon one or more stored maps of an area, and when the autonomous vehicle is in an unmapped area or maps are otherwise unavailable, the autonomous vehicle 102 may be unable to properly navigate. Accordingly, it may be beneficial to allow for manual control of the autonomous vehicle 102. Similarly, certain environments may be better navigated using manual control. By way of non-limiting example, moving the autonomous vehicle in enclosed spaces, such as parking garages and service locations, may be more effectively controlled manually than by computer-generated controls.

In the environment 100 of FIG. 1, the autonomous vehicle 102 is controlled manually via a remote controller 108. More specifically, the remote controller 108 is connected to the autonomous vehicle, e.g., via a wired or wireless connection, such that a person may manipulate controls on the remote controller 108 to control the autonomous vehicle 102. In some examples, the remote controller 108 may have an associated receiver (not shown) that is operably connected to the vehicle 102, e.g., via insertion into a port or other receptacle. Once inserted, the receiver is configured to receive command signals from the remote controller, e.g., wirelessly, at the vehicle 102. Requiring physical connection of a receiver associated with the remote controller 108 to allow for remote controlling of the vehicle may provide better security, e.g., as it may prevent nefarious attempts to override a remote control receiver incorporated into the vehicle. In other embodiments, the receiving capabilities may be incorporated into the vehicle, however, and the remote controller may be paired or otherwise operably connected to the vehicle via a wireless protocol, such as Bluetooth® or the like. In examples of this disclosure, the remote controller 108 may be configured to receive user inputs to control acceleration, braking and/or steering of the autonomous vehicle. To receive such user inputs, the remote controller 108 may include buttons, switches, touch screens, microphones, or any other conventional input mechanism. Signals associated with the user inputs are then sent to the autonomous vehicle, e.g., to a receiver at the autonomous vehicle, and the signals are interpreted by and used at the vehicle to move the vehicle in accordance with the inputs.

The example of FIG. 1 illustrates four scenarios, occurring in sequence, in which a user instructs the vehicle 102, via the controller 108, to move in a first direction indicated by arrow 110. Specifically, FIG. 1 illustrates a first scenario 112 in which the vehicle is in a first position $V_0$, a second scenario 114 in which the vehicle has moved, in a first direction illustrated by arrow 110 to a second position $V_1$, a third scenario in which the vehicle has moved in the first direction to a third position $V_2$, and a fourth scenario 118 in which the vehicle has moved in the first direction to a fourth position $V_3$. In one example, the user input to the remote controller may the same in each scenario, i.e., a command to advance in the direction at a maximum-allowable speed. Also in the embodiment of FIG. 1, the person 104 is stationary, at a position $P_0$. Thus, in FIG. 1, the autonomous vehicle 102 receives commands from a remote controller to move toward the person 104 at a maximum speed.

While the person 104 is indicated as the lone object in the environment 100, other objects, which may be animate or inanimate, may be present also or alternatively. Moreover, as will be evident from the following disclosure, aspects of this disclosure may be equally applicable to objects, such as the person 104 that are moving in the environment 100.

According to implementations of this disclosure, one or more of the sensors 106 may be used to generate sensor data associated with the person 104. Such sensor data may be used to determine a distance of the person 104 from the autonomous vehicle, e.g., a linear distance between $V_0$ and $P_0$ in the first scenario 112 In other implementations, the sensor data may be used to determine a position of the person in a two- or three-dimensional space associated with the environment 100 and/or the vehicle 102, as will be illustrated in more detail in embodiments described below.

In the example illustrated in FIG. 1, the distance of the person 104 from the autonomous vehicle 102 is used to alter (or override) control signals received at the vehicle 102, from the remote controller 108. In the illustrated embodiment, inputs to the controller 108 instruct the autonomous vehicle 102 to move in the direction of the arrow 110. The person 104 is located in that direction. Thus, should the autonomous vehicle 102 continue in that direction, the person 104 could be struck by the autonomous vehicle. However, in implementations of this disclosure, sensor data from the sensors 106 is used to identify the person 104 and prevent the collision. More specifically, the sensors are configured to acquire sensor data associated with the person, and the sensor data is used to determine the distance of the person 104 from the vehicle 102. When the person 104 is outside some threshold distance, the presence of that person is not concerning, and thus controls received from the remote controller 109 may be un-checked, i.e., the vehicle 102 may move according to commands input via the remote controller 108. As the vehicle 102 moves closer to the person 104, however, controls received from controller 108 may be altered, e.g., to reduce a maximum velocity, or as the distance between the vehicle and the person further reduces, controls from the remote controller 108 may be completely ignored, e.g., such that the vehicle 102 is stopped at a safe distance from the person 104.

FIG. 1 is illustrative of this example. Specifically, FIG. 1 schematically illustrates a first zone or region 120 extending a first distance $d_1$ in front of the vehicle and a second zone or region 122 adjacent the first region 120, opposite the vehicle 102, and extending a second distance $d_2$ in front of the vehicle 102. In this example, when objects such as the person 104 are beyond the zones, i.e., a distance from the vehicle that is greater than the distance $d_2$, commands received at the autonomous vehicle 102 from the remote controller 106 are implemented to control the autonomous vehicle, e.g., to control speed and/or steering. Scenarios 112 and 114 illustrate embodiments in which the person 104 is outside both regions 120, 122. As shown by the graph 124, at positions $V_0$ and $V_1$, the vehicle may traverse at a maximum velocity up to a velocity $V_{max}$. $V_{max}$ may be a predetermined velocity that is appropriate for navigating the autonomous vehicle 102 in the environment 100. In implementations of this disclosure, Vmax may be lower, perhaps even significantly lower, than a top speed of the autonomous vehicle 102. For example, the autonomous vehicle 102 may be configured to traverse at maximum posted speed limits, e.g., up to about 120 km/h, but in implementations of this disclosure, the environment 100 may be a service area, a manufacturing or testing facility, a parking lot, a garage or other covered area, and the like, in which it may be desirable to allow a much lower maximum speed, e.g., on the order of about 10 km/h or slower.

As the vehicle 102 traverses closer to the person 104, as in the scenario 116, the person 104 is a distance from the vehicle, i.e., the distance between $V_2$ and $P_0$, that is less than the distance $d_2$. Expressed differently, sensor data from the vehicle sensors 106 indicates that the person 104 is in the second region 122. Because of the closer proximity of the person, as illustrated by the graph 124, the maximum velocity at which the vehicle may proceed is slower than $V_{max}$. Accordingly, a signal from the remote controller 106 to proceed further in the direction of arrow 110 at a maximum speed will result in the vehicle continuing in that direction, but at a slower speed than when traversing between positions 112 and 114, i.e., when the person 104 was not in the region 122. Of course, if the speed commanded by input to the remote controller 108 is slower than the maximum allowable velocity associated with the relative position of the object, the vehicle may still proceed at the commanded speed, i.e., according to the command signals.

The vehicle will continue to traverse in the direction of arrow 110 until the person is located at the threshold that is the distance $d_1$ from the vehicle, i.e., at the intersection of the first region 120 and the second region 122. In this instance, illustrated by the scenario 118, because the person 104 is sensed at the region 120, forward movement is prohibited. Thus, any command signals from the remote controller 108 that would have the vehicle 102 proceed further in the direction of arrow 110 are overridden or ignored so long as the person 104 is at or in the first region 120. The remote controller may still be used to move the vehicle in reserve or laterally (if possible), but the vehicle 102 will not proceed further toward the person 104. As illustrated in the graph 124, at the position $V_3$, the maximum velocity at which the vehicle will proceed in the direction of arrow 110 is zero.

As illustrated by the graph 124, the maximum velocity of the vehicle decreases linearly as relative movement of the vehicle 102 and an object, e.g., the person 104, causes the distance between the vehicle and the object to move from $d_2$ to $d_1$ in the second region. In other embodiments, the decrease in velocity may take some other shape or form. For instance, the maximum velocity may step down at increments of the difference between $d_1$ and $d_2$ or the velocity may decrease according to some curve, e.g., with a relatively slower rate of decrease when the object is closer to $d_2$ than when the object is closer to $d_1$, or vice versa. In addition to changing the rate at which the maximum speed is reduced, other aspects may be varied. For instance, the distances $d_1$ and $d_2$ may be varied depending upon the application. By way of non-limiting example, in a parking environment, such as a parking lot or garage, $d_1$ may be smaller, e.g., because of the proximity of parking spots to each other and to objects such as walls and posts, than in a service environment that may have more space and/or fewer obstacles. In some example implementations, $d_1$ may be from about 1 foot or less to about 5 feet, and $d_2$ may be up to about 5 to 10 feet larger than $d_1$.

Thus, in accordance with the example of FIG. 1, an autonomous vehicle 102 may be controlled remotely, e.g., using the remote controller 106, in a manner that utilizes on-board capabilities, e.g., sensors and drive controllers, to promote safe operation in the environment 100. Although the example of FIG. 1 illustrates the person 104 as an object to avoid, other dynamic objects, e.g., moving vehicles, bicyclists, skateboards, pedestrians, or the like, and static objects, e.g., signs, walls, stanchions, parked vehicles, or the like, may also be sensed and avoided according to implementations of this disclosure. As described with reference to FIG. 1, aspects of this disclosure allow the vehicle to take action (or prohibit action) in response to detecting such objects. In other implementations, the vehicle 102 may also be configured to interact with the environment 100. For example, the autonomous vehicle 102 may be configured to emit audio and/or a visual effect into the environment to interact with objects such as the person 104. For instance, the vehicle may provide an audible warning as an object enters or approaches the second region 122. According to implementations of this disclosure, the audible warning may be a predetermined audible tone or pattern of tones, as in a siren or warning buzzer, or a natural language instruction or warning, e.g., "please back up" or "caution, vehicle moving." Additionally or alternatively, the vehicle may emit a visual signal such as a predetermined light output or pattern of light outputs. The outputs may change, e.g., intensify, as objects get closer. Moreover, the outputs may be dependent upon the type of object. For example, whereas a spoken warning may be effective to ask a pedestrian or bicyclist to change her course of action, the same warning would likely not be effective when directed to a wall or other inanimate object. In still other implementations, the audible and/or visual warnings may be directed to a person operating the remote controller, instead of or in addition to the detected object. For instance, the warnings may be emitted in a direction of the remote controller 106 or may be emitted from the remote controller.

Figure 2A:
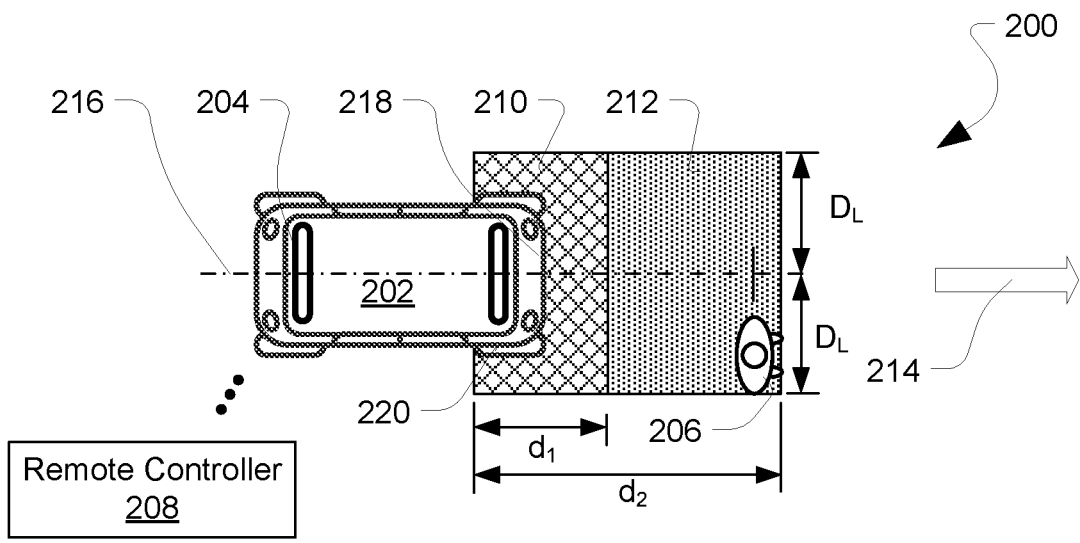
FIGS. 2A, 2B, and 2C are top views illustrating additional aspects of the example of FIG. 1.
Figure 2B:
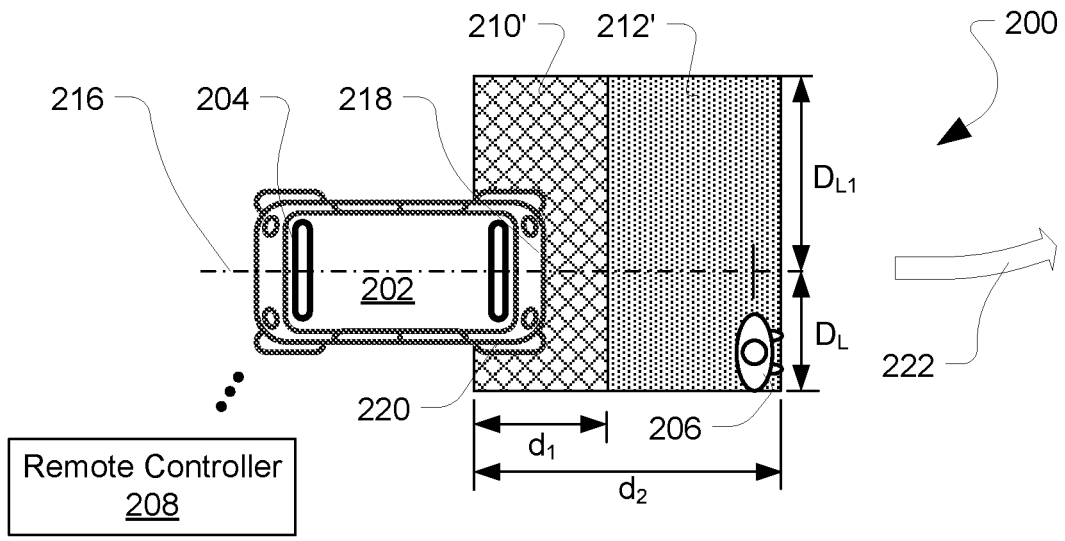
Figure 2C:
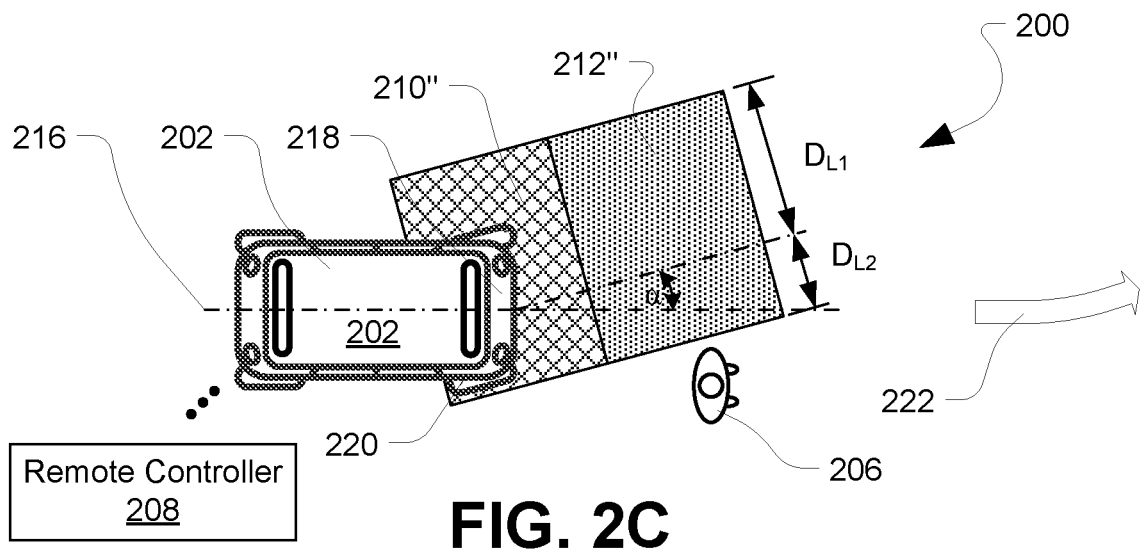

In the embodiment of FIG. 1, the distance of the user from the vehicle is used to control aspects of the vehicle 102. FIGS. 2A, 2B, and 2C are top views of an embodiment similar to that of FIG. 1 showing additional aspects of this disclosure. More specifically, FIGS. 2A, 2B, and 2C show an autonomous vehicle 202 in an environment 200. The autonomous vehicle includes one or more sensors 204 disposed to collect sensor data about the environment 200, including to sense objects, such as a person 206, in the environment 200. The autonomous vehicle 202 and the sensors 204 may be similar to or the same as the autonomous vehicle 102 and the sensors 106, respectively, and will not be discussed here in more detail. Also like the embodiment of FIG. 1, in embodiments of this disclosure, the autonomous vehicle 202 may be controlled remotely, e.g., by a remote controller 208, which may be the same as or similar to the remote controller 108.

Also like previously discussed embodiments, one or more zones may be associated with the vehicle 202. For example, FIGS. 2A and 2B illustrate a first zone or region 210 adjacent the autonomous vehicle 202 and a second zone or region 212 adjacent the first region 210. The first region 210 may be similar to the first region 108 and the second region 212 may be similar to the second region 122. For example, the first region 210 extends a first distance $d_1$ in front of the vehicle 202, i.e., in the direction of travel indicated by arrow 214, and the second region 212 extends a second distance $d_2$ in the same direction. In the example, $d_2$ is greater than $d_1$. As also illustrated in FIG. 2A, in addition to extending in front of the vehicle 202, the first region 210 and the second region 212 extend laterally outwardly from a longitudinal axis 216 extending through the vehicle 202. As illustrated, the first region 210 and the second region 212 may extend a lateral distance $d_L$ from the longitudinal axis 216, and the lateral distance $d_L$ may be such that the first region 210 and/or the second region 212 are wider than the vehicle 202.

As also illustrated in FIG. 2A, the first region 210 may extend behind (i.e., in a direction opposite the arrow 214) a front end 218 of the vehicle 202. Specifically, in the illustration, the first region 210 is illustrated as extending behind front wheels 220 of the autonomous vehicle 202. In other embodiments, the first region 210 may extend further back, up to and including to a position behind the vehicle 202. In addition, the second region 212 may extend further in the lateral direction than the first region. By way of non-limiting example, the first region 210 may comprise a region that completely surrounds or envelopes the vehicle 202, with the second region 212 enveloping the first region 210.

In operation, as with the embodiment described above with reference to FIG. 1, the vehicle 202 is controlled by signals generated at the remote controller 208, but the signals from the remote controller 208 may be altered or ignored based on presence of an object, e.g., the person 206 in the first region 210 or the second region 212 of the environment 200. As with the embodiment of FIG. 1, when an object is not located in either the first region 210 or the second region 212, command signals from the remote controller may not be altered, e.g., a command from a controller to proceed at a given speed will be carried out at the autonomous vehicle to proceed as directed at the given speed. However, if an object is detected in the second region 212, as illustrated in FIG. 2A, the controls from the remote controller may be altered, e.g., to cause the vehicle 202 to proceed at a speed that is slower than the instructed speed. As with previous embodiments, the actual speed may be further reduced as the vehicle 202 gets closer to the person 208, and further movement in the direction of the arrow 214 may be prohibited when the person 206 is located at or in the first region 210.

As illustrated in FIG. 2B, an updated first and second regions 210', 212' may be determined based on changed parameters of the vehicle 202. For instance, the vehicle 202 is controlled in FIG. 2B to traverse generally in accordance with the direction of arrow 222, i.e., the vehicle 202 is controlled to turn left. In response to receiving a control signal to traverse in this manner, the first and second regions 210, 212 are extended laterally in the direction in which the vehicle has been instructed to turn to form the updated first and second regions 210', 212'. As illustrated, the updated regions 210', 212' may extend a distance $D_{L1}$ in the direction of the turn, where DL1 is greater than DL. The updated regions 210', 212' are illustrated as extending still the distance DL in the opposite lateral direction, although that width may also be altered, e.g., by being reduced in width. In examples described herein, by extending the width of the updated regions 210', 212' in the direction of the turn, the vehicle 202 may detect obstructions that may be in the instructed direction of travel, before carrying out the instruction.

In FIG. 2B, there are no obstructions in the updated regions 210', 212' so in FIG. 2B the vehicle 202 carries out the instruction to travel along the arrow 222, i.e., by turning the wheels 220 about a steering angle α. Moreover, as the wheels 220 are rotated about the steering angle α, the first and second regions 210, 212 also rotate with the wheels about the steering angle α to define the updated first and second regions 210", 212". Thus, as illustrated in FIG. 2B, the person 208 has not moved relative to the vehicle 202, but the person 208 is not located in the updated second region 212". Accordingly, the vehicle 202 operates according to the controls received from the remote controller 206.

As also illustrated in FIG. 2C, in addition to rotating about the steering angle α, the updated first and second regions 210", 212" may also be shifted in the lateral direction. For example, as the vehicle 202 turns left, the lateral distance $D_{L1}$ in the direction of the turn may increase (or remain the same as in the updated first and second regions 210', 212'), such that the updated first and second regions 210", 212" extend further outwardly relative to the left side of vehicle. Moreover, the lateral distance $D_{L2}$ may decrease in the opposite direction. Accordingly, the updated regions may be better suited to detect objects that may actually be in the path of the vehicle 202, especially as the vehicle moves in the environment 200. Although FIGS. 2B and 2C show example rotations and/or reconfigurations of the regions 210, 212, other updated regions also are contemplated. For example, instead of being rotated an amount equal to the steering angle, the updated regions 210", 212" may be rotated through a different angle. The size and/or shape of the updated regions could also or alternatively be altered. Moreover, although the updated regions 210', 212' are determined based on the command signal from the remote controller 208, before the vehicle is controlled according to the signal, the vehicle may alternatively begin to the carry out the change in direction upon receiving the command signal, which may obviate the reconfiguration illustrated in FIG. 2B. In other implementations, the regions may be updated substantially simultaneously with moving the vehicle or at some time interval after the wheels 220 are turned. Moreover, although a single example case of controlling the vehicle to turn left is illustrated, the vehicle 202 may be capable of different and, in some instance, less conventional movements. For example, the vehicle 202 may be capable of moving forward in an opposite direction, i.e., in a direction opposite to the arrow 214, in a lateral direction, or any combination therefore. In such examples, the updated regions may reflect such a change, e.g., by being positioned relative to a leading surface or edge of the vehicle, regardless of which edge is leading.

In the foregoing examples, although the first and second regions 210, 212 and the updated first and second regions 210', 210", 212', 212" are illustrated as generally rectangular in shape, these shapes are shown for illustration only. The regions may take other shapes entirely. For instance, the first region and the second region may include arcuate shapes or other polygonal shapes. In some examples, the first region and/or the second region may have arcuate boundaries, e.g., with a radius about a point located on the vehicle, such as on the longitudinal axis. Moreover, the shapes may vary depending upon the trajectory of the vehicle. For instance, an instruction to turn the vehicle may result in the creation of an arcuate shape in the direction of travel.

According to the foregoing examples, commands to control the vehicles 102, 202 are altered depending upon presence of a stationary object in the environment. Similar principles may be applied to dynamic objects. For instance, it may be possible that a person located outside of the safety regions may walk into the safety regions. Such movement of the person may cause the vehicle to slow and potentially stop as quickly as possible.

As will be appreciated from the foregoing, in implementations of this disclosure, in some environments it may be beneficial to control movement of a vehicle with a remote controller. Moreover, commands from the remote controller may be altered based on sensor data indicating objects in an environment. Altering the controls in this manner may leverage on-board resources, e.g., sensors and controllers, to provide greater safety and flexibility. These on-board resources may also be used in additional ways. For example, FIGS. 3, 4A, 4B, and 5 illustrate additional embodiments of this disclosure in which sensor data may be used to remotely control an autonomous vehicle.

FI. 3 illustrates an environment 300 in which an autonomous vehicle 302 is located. The autonomous vehicle 302 includes one or more sensors 304. The autonomous vehicle 302 and the sensors 304 may be similar to or the same as the autonomous vehicles 102, 202 and the sensors 106, 204, respectively, and will not be discussed here in more detail. As in the previous embodiments described herein, the sensors may be configured to sense objects in the environment 300. A person 306 is an example of an object in the environment 300. Also, based on the sensor data, it may be possible to determine a position of the person 306 relative to the autonomous vehicle 302. For instance, sensor data may be used to determine a distance of the person 306 from the autonomous vehicle 302, to determine a position of the person in a coordinate system associated with the environment 300 and/or the autonomous vehicle 302, and/or other location information of the person 306. In implementations of this disclosure, the position of the person 306 relative to the autonomous vehicle 302 may comprise control commands for moving the autonomous vehicle 302. For example, the autonomous vehicle 302 may be configured to react to the person being inside a control zone or region 308 adjacent to the vehicle 302. As illustrated, the control region 308 extends a distance $d_1$ from the autonomous vehicle 302.

Figure 3:
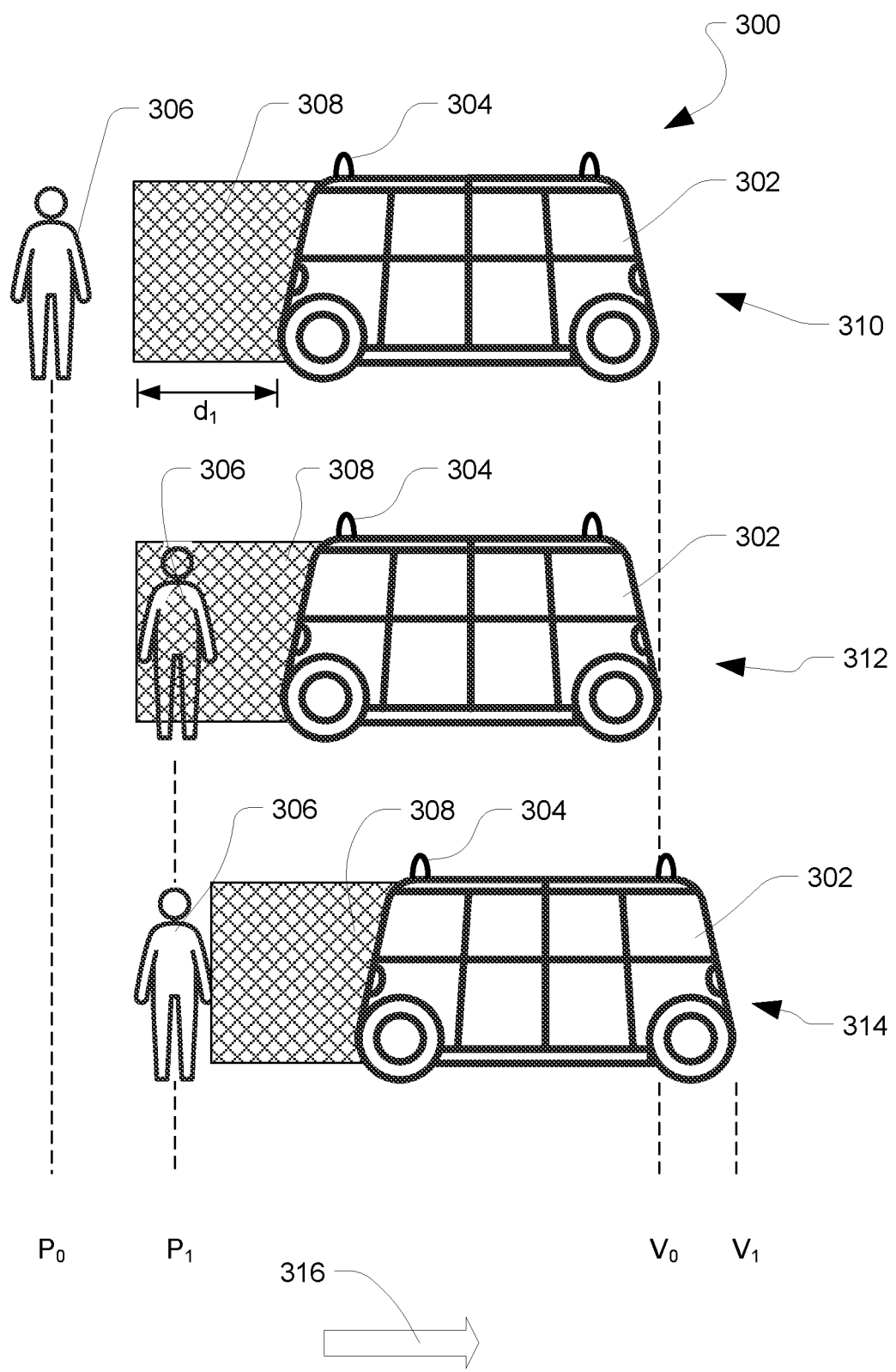
FIG. 3 illustrates another example of external control of an autonomous vehicle in an environment according to additional aspects of this disclosure.

More specifically, FIG. 3 illustrates three scenarios, at successive times. Thus, a first scenario 310 occurs before a second scenario 312, which occurs before a third scenario 314. In the first scenario 310, the person 306 is standing at an initial position $P_0$, and the vehicle 302 is at rest at an initial position $V_0$. The person 306 is outside the control region 308, i.e., the person 306 is a distance from the vehicle 302 greater than the distance $d_1$. Because the person 306 is outside the control region 308, no action is taken at the vehicle 302. In the second scenario 312, however, the person 306 has moved in the direction of arrow 316 toward the vehicle 302, to a position $P_1$. At this position, the sensor data from the sensors 304 is used to determine that the person 306 is inside the control region 308, and based on the person 306 being in the control region, the vehicle 302 moves to a new position $V_1$, as illustrated in the third scenario 314. In this example, the vehicle 302 moves to maintain the person 306 at or beyond the threshold distance $d_1$.

In addition to the position of the person 306 determining the distance of travel of the vehicle 302, the position of the person 306 may also instruct a speed at which the vehicle travels. For instance, as the distance between the person 306 and the vehicle 302 decreases, e.g., because the person moves toward the vehicle 302 relatively faster than the vehicle is moving, the speed at which the vehicle moves may increase. For example, the speed at which the vehicle moves may be a function, such as a linear, exponential, or other function of the distance between the person 306 and the vehicle 302.

Figure 4A:
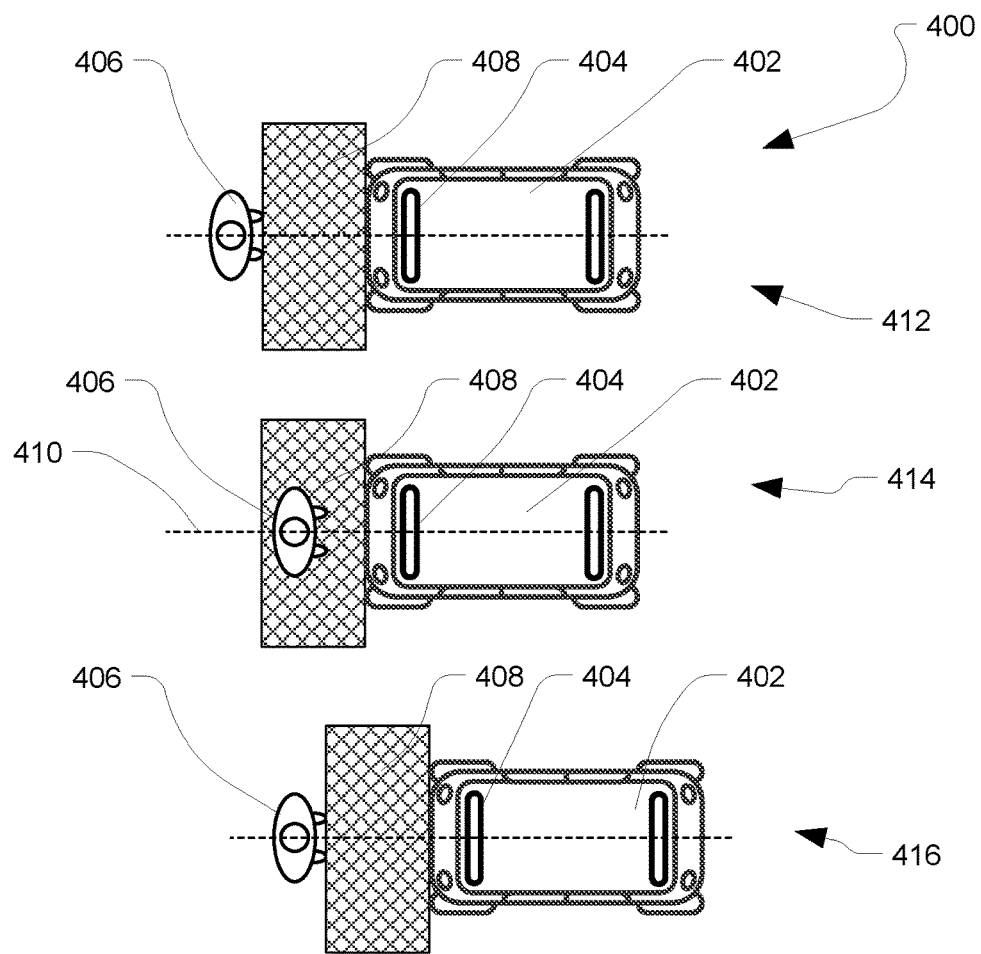
FIGS. 4A and 4B are top views illustrating additional aspects of the example of FIG. 3.
Figure 4B:
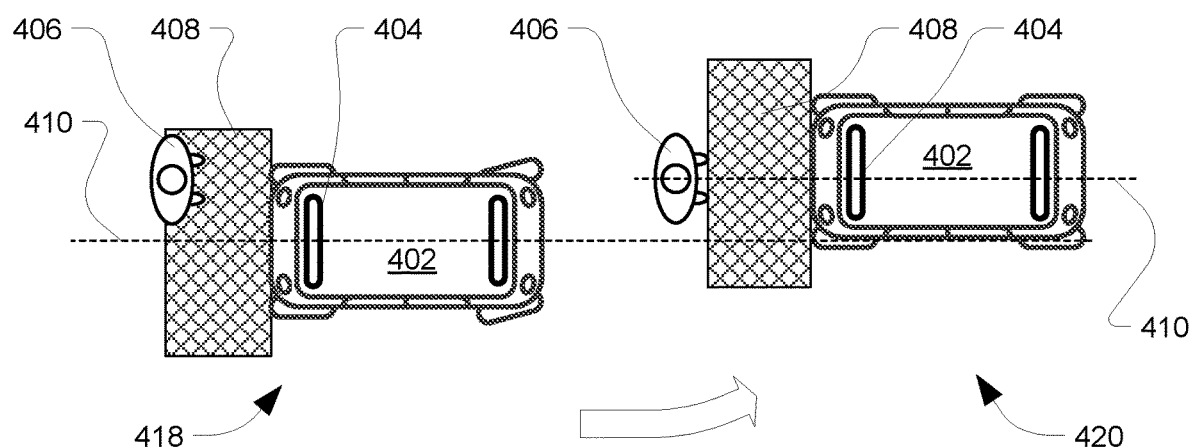

FIGS. 4A and 4B illustrate further embodiments of moving a vehicle using inputs derived from a position of a person or other object relative to the vehicle. Specifically, these figures illustrate an environment 400 in which an autonomous vehicle 402 may move. The autonomous vehicle 402 may include one or more sensors 404 to detect objects such as a person 406. As with the embodiment of FIG. 3, a control region 408 may be established adjacent the vehicle 402. FIGS. 4A and 4B show top views of the environment, and as illustrated, the region 408 is symmetrical about a longitudinal axis 410 of the vehicle 402. FIG. 4A illustrates three successive scenarios 412, 414, 416. FIG. 4B illustrates two additional scenarios 418, 420, also successive in time. More specifically, and as will be detailed below, scenario 420 is after, and a result of, scenario 418.

The three scenarios 412, 414, 416 are similar to the scenarios 310, 312, 314 discussed above. Specifically, in scenario 412, the person 406 is located along the longitudinal axis 410, but is outside the control region 408. In scenario 414, the person 406 has moved toward the vehicle 402, along the longitudinal axis 410, such that the person 406 is inside the control region 408. When the person is detected in the control region 408, the autonomous vehicle moves away from the person 406, along the longitudinal axis 410, as illustrated in scenario 416.

FIG. 4B illustrates the additional scenarios 418, 420. Specifically, in scenario 418 the person 406 has moved to a position in the control region 408 that is off the longitudinal axis 410. As illustrated by scenario 420, the vehicle 402 responds by moving forward and turning to the left. In this example, the autonomous vehicle navigates to a position at which the person 406 is outside the control region 406, but generally on the longitudinal axis 410. Accordingly, in aspects of this embodiment, the person 406 may be able to control steering of the autonomous vehicle 402 based on her positioning relative to the vehicle 402.

Other features and modifications also are contemplated. For example, the control system on the autonomous vehicle 402 may be configured to behave in myriad different ways based on the person's position. For instance, the autonomous vehicle 402 may be configured to first attempt to align the person 406 along the longitudinal axis, e.g., before moving forward. In such an example, the vehicle 402 would turn right in response to the position illustrated in scenario 418 to re-align the person 406 on the longitudinal axis 410. Once aligned, the vehicle may then advance forward in a manner that maintains with the person 406 generally on the longitudinal axis 410. In other modifications, the control region 408 may surround the entire vehicle 402, such that the person 406 could approach the vehicle 402 from any direction, with the result being that the vehicle moves away from the person in a direction opposite the direction of approach of the person to maintain the person 406 outside the control region 408.

The system described in connection with FIGS. 3, 4A and 4B may be combined with the system described above with reference to FIGS. 1, 2A and 2B. For instance, whereas FIGS. 1, 2A and 2B were described as receiving and augmenting command signals from a remote controller, the received command signals may be signals generated by detection of a person in the control regions, e.g., 308, 408. For instance, the concepts detailed above with respect to FIGS. 1, 2A and 2B may be used to override or alter commands determined based on the concepts detailed with respect to FIGS. 3, 4A and 4B. By way of example, a control region, such as one of the control regions 308, 408, may be defined proximate a first end of a vehicle whereas one or more safety regions, such as the safety regions 120, 122, 210, 212 proximate an opposite, second end of the vehicle. Depending upon the size of the vehicle, for instance, it may be particularly difficult to see obstacles and/or spacing of obstacles proximate an opposite end of the vehicle, and thus this arrangement may prevent the user controlling the vehicle from inadvertently contacting an object.

Figure 5:
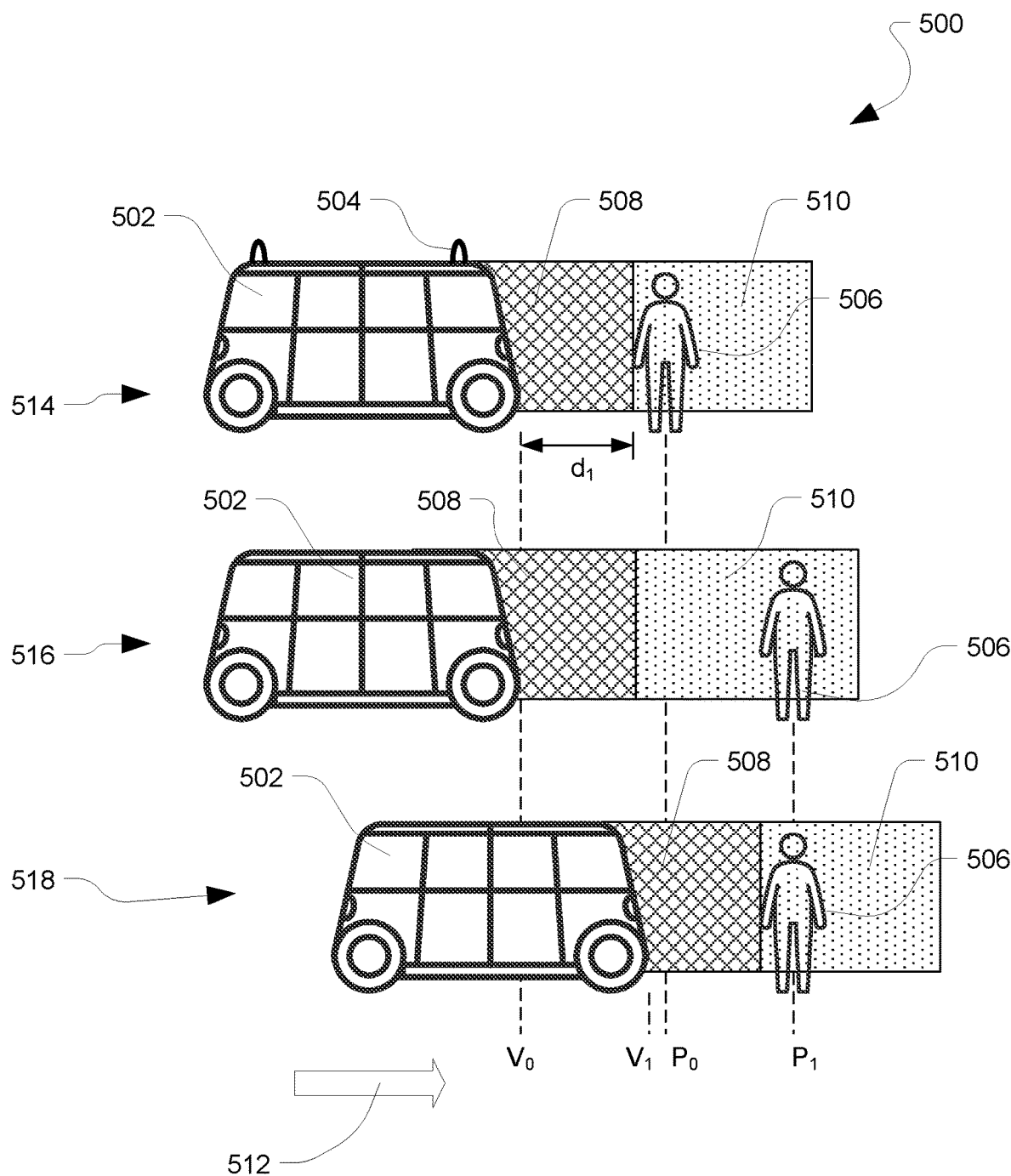
FIG. 5 illustrates another example of external control of an autonomous vehicle in an environment according to additional aspects of this disclosure.

FIG. 5 illustrates another example implementation of controlling a vehicle. Specifically, FIG. 5 illustrates an environment 500 in which a vehicle 502 is configured to travel. As with previous embodiments, the vehicle 502 may be an autonomous vehicle and includes one or more sensors 504 disposed to sense attributes of the environment 500. The sensors 504 may be any one or more of the types of sensors set forth above, and may be configured to sense objects such as a person 506 in the environment 500. Similar to the embodiments of FIGS. 4A and 4B, positioning of the person 506 relative to the vehicle 502 is used to control the vehicle 502.

More specifically, FIG. 5 illustrates two regions 508, 510 proximate an end of the vehicle 502. For example, the first region 508 may be a buffer region and the second region 510 may be a control region. In general, the vehicle 502 is controlled to maintain the person 506 at a predetermined distance $d_1$, i.e., at the intersection of the first region 508 and the second region 510, and may be controlled based on the position of the person 506 in the second region 510. For instance, in a first scenario 514, the person 506 is positioned at an initial position $P_0$, at the intersection of the first region 508 and the second region 510. Also in the first scenario 514, the vehicle is stationary, at an initial vehicle position $V_0$. In a second scenario 516, the person 506 moves away from the vehicle 502 in a direction indicated by an arrow 512 to a second position $P_1$. Thus, the person is still in the second control region 510, but has moved further away. In response to determining that the person 506 has moved further away, the vehicle 502 advances toward the person 506, as illustrated in the third scenario 518, to place the vehicle in a second position $V_1$. In this second position $V_1$, the vehicle has repositioned itself to place the person 506 at the intersection of the first region 508 and the second region 510, as in the first scenario 514. Although not illustrated, and similar to concepts described above, the position of the person 506 relative to the vehicle may also cause the vehicle to steer or turn.

Thus, in FIG. 5, the vehicle "follows" the person 506, as opposed to the embodiment illustrated in FIGS. 3, 4A, and 4B, in which the vehicle 502 "retreats" from the person 506. In some implementations of this disclosure, the vehicle may be further controlled to recognize a person or object prior to taking controls from that person/object and/or to recognize attributes of that person or object as commands. For instance, in the examples of FIGS. 3, 4A, 4B, and 5, it may be desirable that the person 306, 406, 506 is first verified as being a source for providing controls. For example, the person may possess an associated device, such as a personal electronic device, that is recognized by the autonomous vehicle. The autonomous vehicle may be configured to receive commands from the person only upon this recognition. For instance, the device associated with the person may sync to the autonomous vehicle using a secured wireless protocol. By way of other non-limiting examples, the person desiring to control the vehicle may present a verifiable QR code or bar code, e.g., on a display of an electronic device, or may present a physical object or pattern, such as a fiducial. In other examples, the vehicle 202 may be configured to recognize certain gestures or audible commands, e.g., as "passwords," the recognition of which acts as an instruction to the vehicle to take commands from the person. In some examples, sensors on the vehicle may be used to verify the code, object, pattern, gesture or voice command. In still other embodiments, one or more sensors associated with the autonomous vehicle may recognize the person, e.g., via facial recognition, voice recognition, or some other recognition and/or identification protocol. In still further embodiments, taking control of the vehicle in implementations described above may cause the vehicle 202 to respond to instructions other than movement of the person. By way of non-limiting example, the sensors on the vehicle may detect hand or other gestures and move according to those gestures. Moreover, the sensors on the vehicle may respond in other ways, including following other objects, such as other vehicles or other physical objects.

The system described in connection with FIG. 5 also may be combined with the system described above with reference to FIGS. 1, 2A and 2B. For instance, whereas FIGS. 1, 2A and 2B were described as receiving and augmenting command signals from a remote controller, the received command signals may be signals generated by detection of a person in the control regions, e.g., 508, 510. For instance, the concepts detailed above with respect to FIGS. 1, 2A and 2B may be used to override or alter commands determined based on the concepts detailed with respect to FIG. 5. By way of example, one or more control regions, such as one of the control regions 508, 510, and one or more safety regions, such as the safety regions 120, 122, 210, 212 may be determined proximate a leading (i.e., forward in the direction of travel) end of the vehicle. In such embodiments, because the control and safety regions are likely to overlap, the vehicle controls may be able to differentiate between a person having authority to control the vehicle and all other objects, for example.

Figure 6:
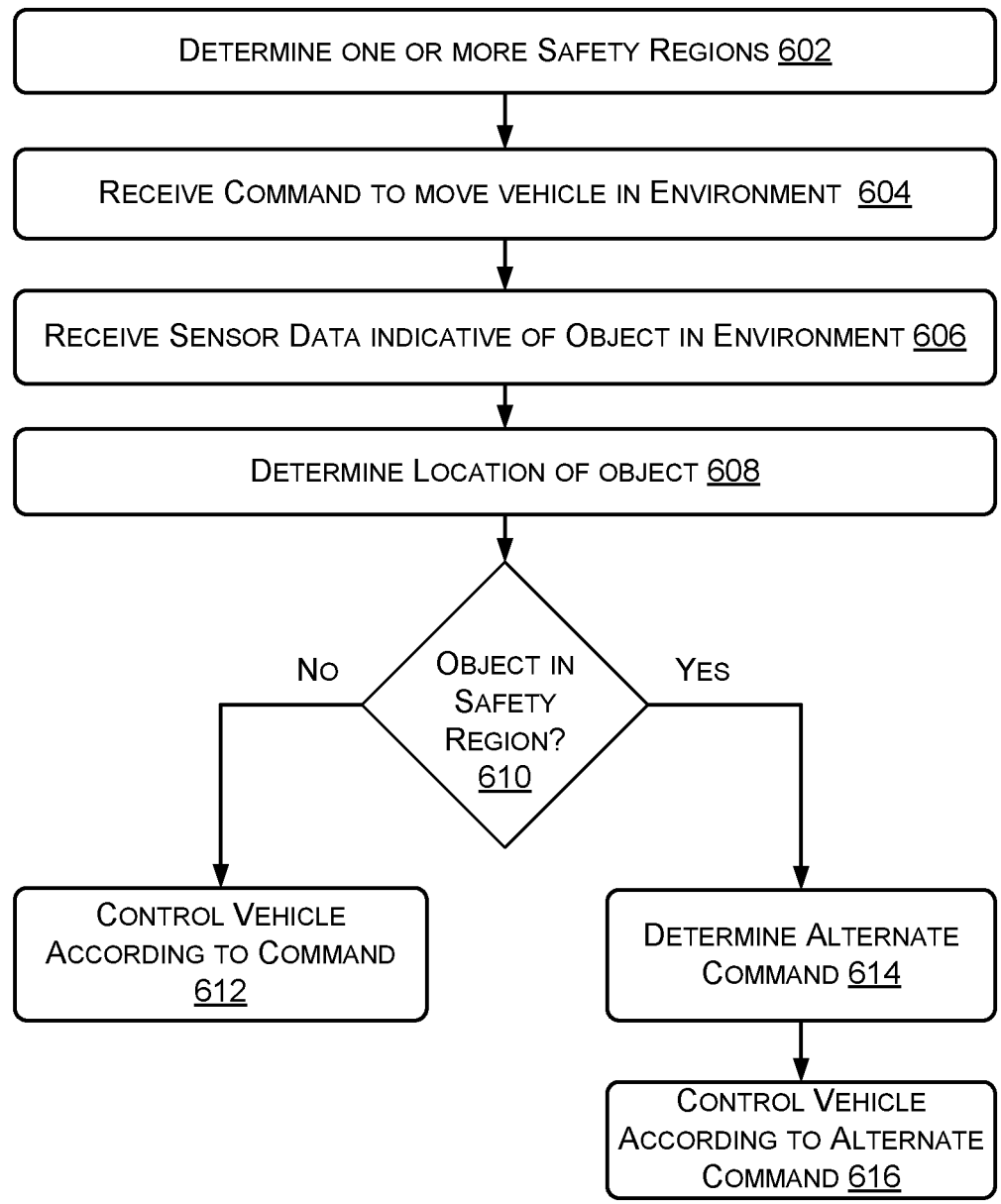
FIG. 6 depicts a flow chart representative of one or more processes for external control of an autonomous vehicle.
Figure 7:
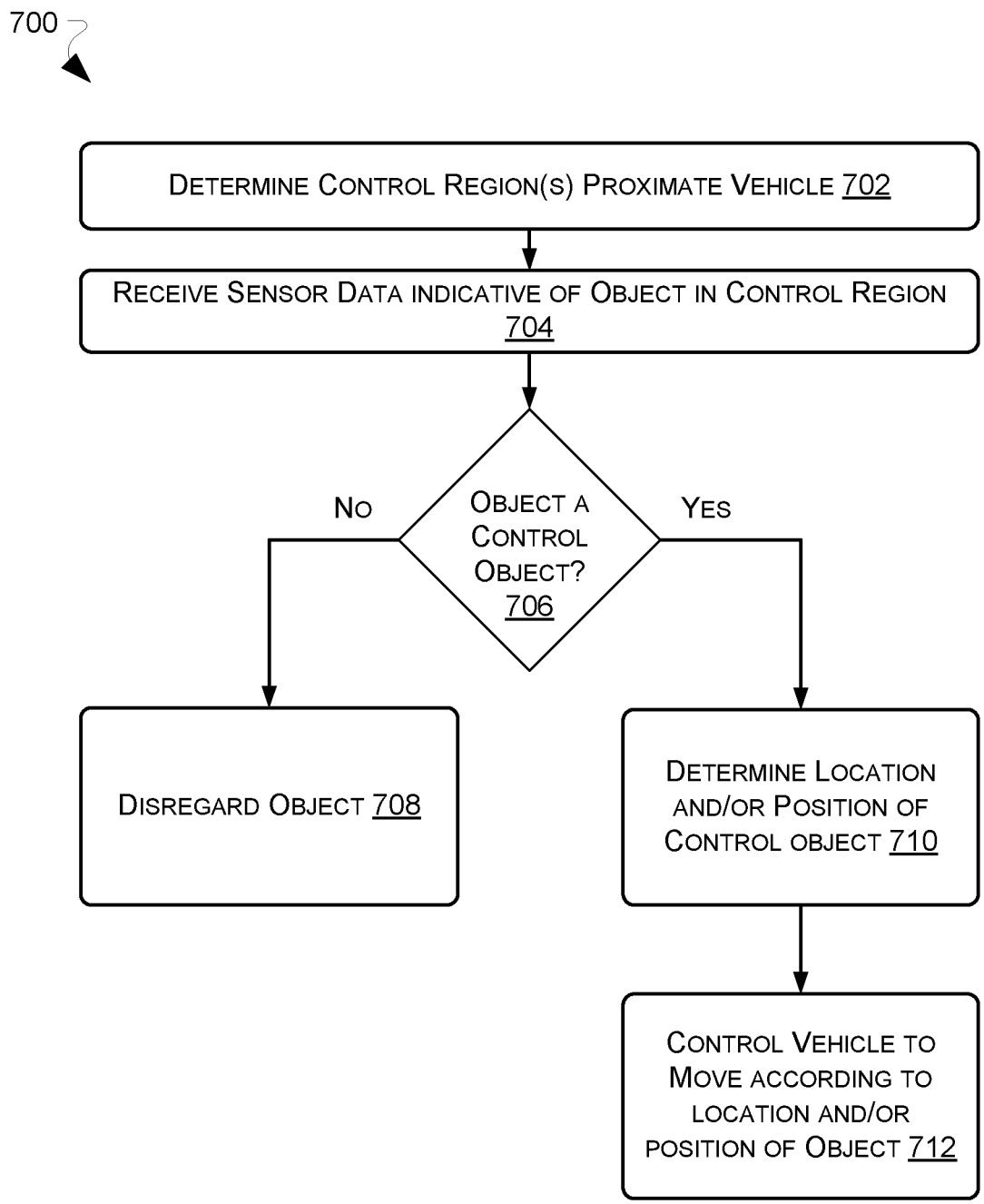
FIG. 7 depicts a flow chart representative of one or more additional processes for external control of an autonomous vehicle.

FIGS. 6 and 7 are flow diagrams illustrating example methods 600, 700 of controlling a vehicle, such as an autonomous vehicle, using external controls. The methods 600, 700 shown in FIGS. 6 and 7 are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors (e.g., by one or more processors or other components of a controller), cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

It should be appreciated that the subject matter presented herein may be implemented as a computer process, a computer-controlled apparatus, a computing system, or an article of manufacture, such as a computer-readable storage medium. While the subject matter described with respect to the methods 600, 700 are presented in the general context of operations that may be executed on and/or with one or more computing devices, those skilled in the art will recognize that other implementations may be performed in combination with various program/controller modules. Generally, such modules include routines, programs, components, data structures, and other types of structures that perform particular tasks or implement particular abstract data types.

Those skilled in the art will also appreciate that aspects of the subject matter described with respect to the methods 600, 700 may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

As shown in FIG. 6, an example method 600 of controlling a vehicle may include, at 602, determining one or more safety regions. For instance, as illustrated in FIGS. 1, 2A and 2B, the safety regions may include a first region adjacent the vehicle and a second region extending from the first region. The regions may be located proximate only an end of the vehicle, e.g., at an end that is a leading end in the direction of travel of the vehicle, or the regions may be more extensive. In some instances, the one or more regions may completely surround or envelope the autonomous vehicle. Moreover, different regions may be associated with different behaviors, as detailed above and below. In some examples, the region(s) may change based on the vehicle behavior (e.g. as the vehicle changes direction, reverses, etc.).

The example method 600 also includes, at 604, receiving a command to move the vehicle in the environment. In some example, the vehicle may be an autonomous vehicle that may not include conventional control devices such as a steering wheel, acceleration controls, and/or braking controls. In some instance, the vehicle may be controlled by a person outside the vehicle. The person may input controls via a remote controller and/or the person may make gestures or take actions that are interpreted as control signals (e.g. moving towards and/or away from the vehicle). In some instances, the controller may override normal operations of the vehicle For example, normal controls associated with movement of the vehicle may be suspended while the vehicle is controlled remotely.

The example method 600 also includes, at 606, receiving sensor data indicating an object in the environment 606, and, at 608, determining a location of the object sensed at 606. For example, the vehicle may include one or more sensors, including one or more types of sensors, that are configured to sense objects in the environment. Such sensors may include LIDAR, RADAR, image capture devices, and combinations thereof. For example, the location of the object may include a distance from the vehicle and/or a position of the object, e.g., in a two- or three-dimensional coordinate system describing the environment. In those examples where more than one object is present in the environment, the object closest to the vehicle may the object sensed at 606.

At 610, the example method 600 includes determining whether the object is located in one of the one or more safety regions. At 612, upon determining that the object is not in the safety region, the method 600 includes controlling the vehicle in accordance with the command received at 604. For instance, when the object is not in the safety region, the risk of contacting the object may be sufficiently low that the vehicle may be controlled according to the remote commands.

In contrast, if it is determined at 610 that the object is in the safety region, the method 600 includes, at 614, determining an alternate command for moving the vehicle and, at 616, controlling the vehicle according to the alternate command. For example, if the object is in a first safety region adjacent the vehicle, the command to move the vehicle may be ignored and the vehicle may remain stationary (or be stopped substantially immediately), e.g., to avoid contacting the object. In other examples, the object may be in a second region spaced from the vehicle, and the controls may be altered to proceed at a slower speed than a an instructed or commanded speed. For instance, as in the embodiments described above with reference to FIGS. 1, 2A, and 2B, control signals received from a remote controller may be altered to reduce a commanded velocity of the vehicle, e.g., depending upon a proximity of the object to the vehicle. Such velocity may be altered as a function of the proximity, either linearly, or otherwise (exponentially, etc.).

FIG. 7 illustrates another example process 700 for external control of a vehicle. For example, the process 700 may be carried out by systems described above, including but not limited to the systems illustrated in FIGS. 3, 4A, 4B and 5. More specifically, the process 700 may be carried out to allow a control object, such as a person, to control movement of a vehicle such as an autonomous vehicle.

The example method 700 may include, at 702, determining one or more control regions proximate a vehicle. For instance, the control region may be a region adjacent the vehicle, as in FIGS. 3, 4A and 4B, may be a region spaced from the vehicle, as in FIG. 5.

The example method 700 may also include, at 704, receiving sensor data indicative of one or more objects in the control region(s). For example, the vehicle may include one or more sensors, including one or more types of sensors, that are configured to sense objects in the environment. Such sensors may include LIDAR, RADAR, image capture devices, and combinations thereof. For example, the location of the object may include a distance from the vehicle and/or a position of the object, e.g., in a two- or three-dimensional coordinate system describing the environment.

At 706, the process 700 may also include determining whether the object in the control region is a control object. For example, the sensor data may be analyzed to determine whether a sensed object is authorized to control the vehicle. For instance, individuals may be recognized as control objects via recognition of the person using facial or other biometric recognition at the vehicle. In other implementations, an electronic device associated with a person may be authenticated for controlling the vehicle, e.g., by syncing or otherwise associating with the vehicle. In still other implementations, a person may be authenticated by presenting a control symbol, such as a code, a pattern, or tangible object.

If, at 706, it is determined that a control object is not a control object, the object is disregarded at 708. Alternatively, if, at 706, the control object is determined to be a control object, a location of the control object is determined at 710, and at 712 the vehicle is controlled to move according to the location and/or the position. In example embodiments described above, the vehicle may be configured to move toward the control object, or away from the control object, in both instances to maintain a distance and/or positional relationship between the vehicle and the control object. In some examples, such control may be additionally or alternatively based on a detected gesture, fiducial, or otherwise associated with the control object.

In the foregoing embodiments, vehicles, such as autonomous vehicles, may be controlled based on objects sensed in an environment. While varying zones and regions are discussed in the foregoing, the size and extent of those regions may be varied in the foregoing examples. As will be appreciated, the sensors on the vehicle may be able to sense the presence of objects at relatively large distances. For example, the sensors may be able to sense and/or classify objects up to about 100 feet or more away. While an object 100 feet away would be of interest to a vehicle traversing across a city or between destinations, objects at that distance are not likely to influence controlled travel of the vehicle in implementations described herein. Thus, as discussed above with regard to FIG. 1, the parameters of the zones and regions may be application specific and/or environment specific. Accordingly, while objects outside the regions may be detected, they may not be used to control or augment controlling of a vehicle according to implementations of this disclosure.

Figure 8:
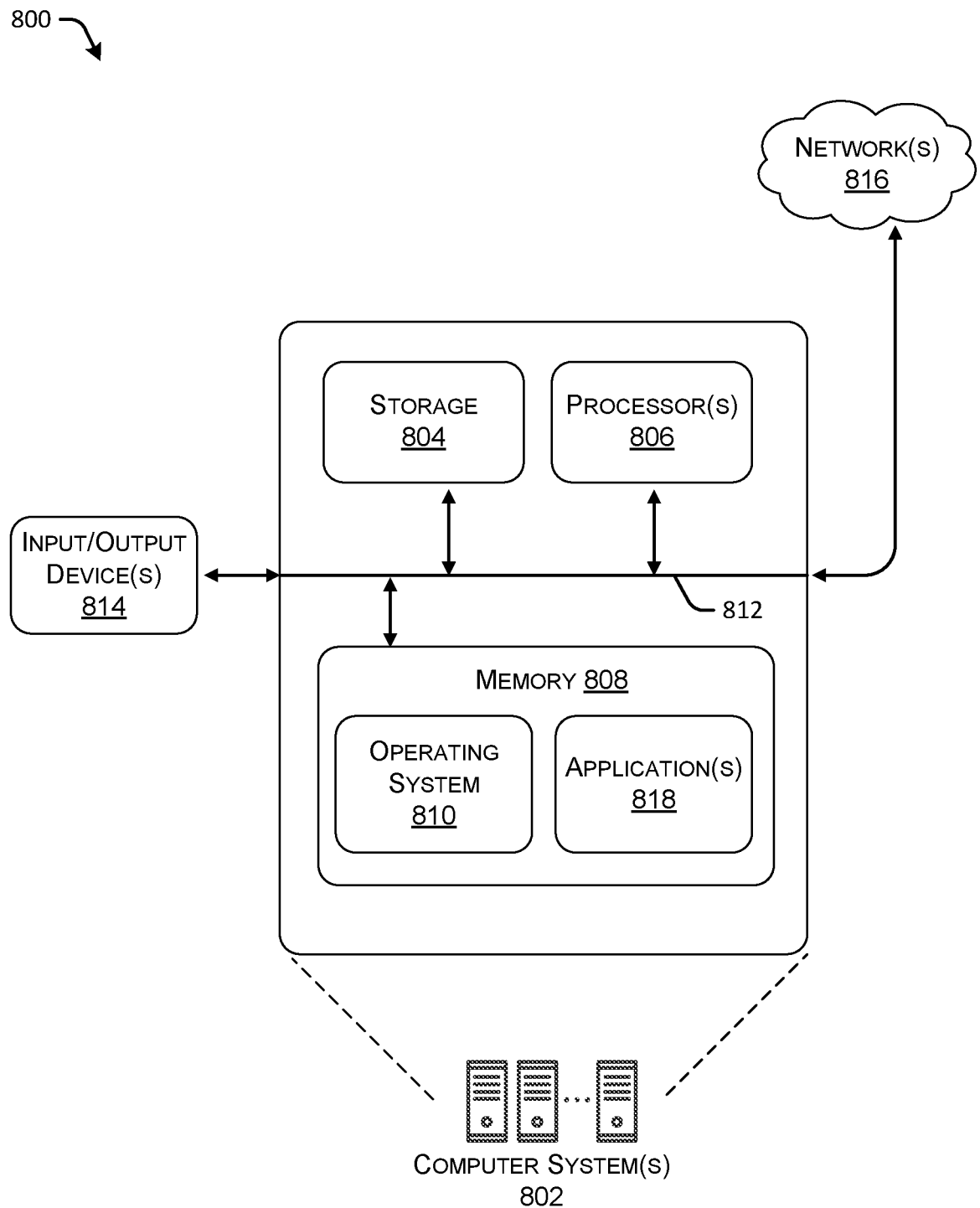
FIG. 8 depicts an example computerized system usable to implement aspects of this disclosure.

Turning briefly to FIG. 8, a computerized system 800 is depicted as an example computerized system on which the invention may be implemented in whole or in part. The computerized system 800 depicts a computer system 810 that comprises a storage 860, a processor 870, a memory 840, and an operating system 820. The storage 860, processor 870, memory 840, and operating system 820 may be communicatively coupled over a communication infrastructure 850. Optionally, the computer system 810 may interact with a user, or environment, via I/O devices 830, as well as one or more other computing devices over a network 880, via the communication infrastructure 850. The operating system 820 may interact with other components to control one or more applications 802.

The systems and methods described herein can be implemented in software or hardware or any combination thereof. The systems and methods described herein can be implemented using one or more computing devices which may or may not be physically or logically separate from each other. The methods may be performed by components arranged as either on-premise hardware, on-premise virtual systems, or hosted-private instances. Additionally, various aspects of the methods described herein may be combined or merged into other functions.

An example computerized system for implementing the invention is illustrated in FIG. 8. A processor or computer system can be configured to particularly perform some or all of the methods described herein. In some embodiments, the methods can be partially or fully automated by one or more computers or processors. The invention may be implemented using a combination of any of hardware, firmware and/or software. The present invention (or any part(s) or function(s) thereof) may be implemented using hardware, software, firmware, or a combination thereof and may be implemented in one or more computer systems or other processing systems. In some embodiments, the illustrated system elements could be combined into a single hardware device or separated into multiple hardware devices. If multiple hardware devices are used, the hardware devices could be physically located proximate to or remotely from each other. The embodiments of the methods described and illustrated are intended to be illustrative and not to be limiting. For example, some or all of the steps of the methods can be combined, rearranged, and/or omitted in different embodiments.

In one exemplary embodiment, the invention may be directed toward one or more computer systems capable of carrying out the functionality described herein. Example computing devices may be, but are not limited to, a personal computer (PC) system running any operating system such as, but not limited to, OS X™, iOS™, Linux™, Android™, and Microsoft™ Windows™. However, the invention may not be limited to these platforms. Instead, the invention may be implemented on any appropriate computer system running any appropriate operating system. Other components of the invention, such as, but not limited to, a computing device, a communications device, mobile phone, a telephony device, a telephone, a personal digital assistant (PDA), a personal computer (PC), a handheld PC, an interactive television (iTV), a digital video recorder (DVD), client workstations, thin clients, thick clients, proxy servers, network communication servers, remote access devices, client computers, server computers, routers, web servers, data, media, audio, video, telephony or streaming technology servers, etc., may also be implemented using a computing device. Services may be provided on demand using, e.g., but not limited to, an interactive television (iTV), a video on demand system (VOD), and via a digital video recorder (DVR), or other on demand viewing system.

The system may include one or more processors. The processor(s) may be connected to a communication infrastructure, such as but not limited to, a communications bus, cross-over bar, or network, etc. The processes and processors need not be located at the same physical locations. In other words, processes can be executed at one or more geographically distant processors, over for example, a LAN or WAN connection. Computing devices may include a display interface that may forward graphics, text, and other data from the communication infrastructure for display on a display unit.

The computer system may also include, but is not limited to, a main memory, random access memory (RAM), and a secondary memory, etc. The secondary memory may include, for example, a hard disk drive and/or a removable storage drive, such as a compact disk drive CD-ROM, etc. The removable storage drive may read from and/or write to a removable storage unit. As may be appreciated, the removable storage unit may include a computer usable storage medium having stored therein computer software and/or data. In some embodiments, a machine-accessible medium may refer to any storage device used for storing data accessible by a computer. Examples of a machine-accessible medium may include, e.g., but not limited to: a magnetic hard disk; a floppy disk; an optical disk, like a compact disk read-only memory (CD-ROM) or a digital versatile disk (DVD); a magnetic tape; and/or a memory chip, etc.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The processing system can be in communication with a computerized data storage system. The data storage system can include a non-relational or relational data store, such as a MySQL™ or other relational database. Other physical and logical database types could be used. The data store may be a database server, such as Microsoft SQL Server™, Oracle™, IBM DB2™ SQLITE™, or any other database software, relational or otherwise. The data store may store the information identifying syntactical tags and any information required to operate on syntactical tags. In some embodiments, the processing system may use object-oriented programming and may store data in objects. In these embodiments, the processing system may use an object-relational mapper (ORM) to store the data objects in a relational database. The systems and methods described herein can be implemented using any number of physical data models. In one example embodiment, an RDBMS can be used. In those embodiments, tables in the RDBMS can include columns that represent coordinates. In the case of economic systems, data representing companies, products, etc. can be stored in tables in the RDBMS. The tables can have pre-defined relationships between them. The tables can also have adjuncts associated with the coordinates.

In alternative exemplary embodiments, secondary memory may include other similar devices for allowing computer programs or other instructions to be loaded into computer system. Such devices may include, for example, a removable storage unit and an interface. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units and interfaces, which may allow software and data to be transferred from the removable storage unit to computer system. The computing device may also include an input device such as, but not limited to, a voice input device, such as a microphone, touch screens, gesture recognition devices, such as cameras, other natural user interfaces, a mouse or other pointing device such as a digitizer, and a keyboard or other data entry device (not shown). The computing device may also include output devices, such as but not limited to, a display, and a display interface. Computer may include input/output (I/O) devices such as but not limited to a communications interface, cable and communications path, etc. These devices may include, but are not limited to, a network interface card, and modems. Communications interface may allow software and data to be transferred between computer system and external devices.

In one or more embodiments, the computing device may be operatively coupled to an automotive system. Such automotive system may be either manually operated, semi-autonomous, or fully autonomous. In such an embodiment, input and output devices may include an image capture device, and controllers, microcontrollers, or other processors to control automotive functions such as, but not limited to, acceleration, braking, and steering. Further, communication infrastructure in such embodiments may also include a Controller Area Network (CAN) bus.

In one or more embodiments, the present embodiments are practiced in the environment of a computer network or networks. The network can include a private network, or a public network (for example the Internet, as described below), or a combination of both. The network includes hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them using interprocess communication pathways. On these pathways, appropriate communications protocols are used.

An exemplary computer and/or telecommunications network environment in accordance with the present embodiments may include node, which include may hardware, software, or a combination of hardware and software. The nodes may be interconnected via a communications network. Each node may include one or more processes, executable by processors incorporated into the nodes. A single process may be run by multiple processors, or multiple processes may be run by a single processor, for example. Additionally, each of the nodes may provide an interface point between network and the outside world, and may incorporate a collection of sub-networks.

In an exemplary embodiment, the processes may communicate with one another through interprocess communication pathways supporting communication through any communications protocol. The pathways may function in sequence or in parallel, continuously or intermittently. The pathways can use any of the communications standards, protocols or technologies, described herein with respect to a communications network, in addition to standard parallel instruction sets used by many computers.

The nodes may include any entities capable of performing processing functions. Examples of such nodes that can be used with the embodiments include computers (such as personal computers, workstations, servers, or mainframes), handheld wireless devices and wireline devices (such as personal digital assistants (PDAs), modem cell phones with processing capability, wireless email devices including BlackBerry™ devices), document processing devices (such as scanners, printers, facsimile machines, or multifunction document machines), or complex entities (such as local-area networks or wide area networks) to which are connected a collection of processors, as described. For example, in the context of the present invention, a node itself can be a wide-area network (WAN), a local-area network (LAN), a private network (such as a Virtual Private Network (VPN)), or collection of networks.

Communications between the nodes may be made possible by a communications network. A node may be connected either continuously or intermittently with communications network. As an example, in the context of the present invention, a communications network can be a digital communications infrastructure providing adequate bandwidth and information security.

The communications network can include wireline communications capability, wireless communications capability, or a combination of both, at any frequencies, using any type of standard, protocol or technology. In addition, in the present embodiments, the communications network can be a private network (for example, a VPN) or a public network (for example, the Internet).

A non-inclusive list of exemplary wireless protocols and technologies used by a communications network may include Bluetooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

Embodiments of the present invention may include apparatuses for performing the operations herein. An apparatus may be specially constructed for the desired purposes, or it may comprise a general purpose device selectively activated or reconfigured by a program stored in the device.

In one or more embodiments, the present embodiments are embodied in machine-executable instructions. The instructions can be used to cause a processing device, for example a general-purpose or special-purpose processor, which is programmed with the instructions, to perform the steps of the present invention. Alternatively, the steps of the present invention can be performed by specific hardware components that contain hardwired logic for performing the steps, or by any combination of programmed computer components and custom hardware components. For example, the present invention can be provided as a computer program product, as outlined above. In this environment, the embodiments can include a machine-readable medium having instructions stored on it. The instructions can be used to program any processor or processors (or other electronic devices) to perform a process or method according to the present exemplary embodiments. In addition, the present invention can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution).

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as CUDA, OpenCL, Flash™, JAVA™, C++, C, C#, Python, Visual Basic™ JavaScript™ PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, iOS™, Unix™/X-Windows™, Linux™, etc. The system could be implemented using a web application framework, such as Ruby on Rails.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The systems, modules, and methods described herein can be implemented using any combination of software or hardware elements. The systems, modules, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the invention may be practiced with other computer system configurations, including hand-held devices, microprocessor systems, microprocessor-based or programmable consumer electronics, minicomputers, mainframe computers, etc. The invention may also be practiced in distributed computing environments where tasks are performed by remote processing devices that are linked through a network.

The terms "computer program medium" and "computer readable medium" may be used to generally refer to media such as but not limited to removable storage drive, a hard disk installed in hard disk drive. These computer program products may provide software to computer system. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. As non-limiting examples, "processor" may be a Central Processing Unit (CPU) or a Graphics Processing Unit (GPU). A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered as a system.

While one or more embodiments of the invention have been described, various alterations, additions, permutations and equivalents thereof are included within the scope of the invention.

The preceding detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described above are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in this written description. It is also to be understood that the specific devices and processes illustrated in the attached drawings, and described herein, are simply exemplary embodiments of the inventive concepts defined in the appended claims. Hence, specific dimensions and other physical characteristics relating to the embodiments disclosed herein are not to be considered as limiting, unless the claims expressly state otherwise.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

What we claim is:

1. A vehicle comprising:
   one or more sensors configured to sense objects in an environment of the vehicle;
   one or more drive systems configured to cause the vehicle to move in the environment;
   a control system configured to:
   receive, from a source external to the vehicle, one or more control commands comprising a command for the vehicle to proceed in a direction at a commanded speed equal to or below about 10 km/h;
   receive sensor data from the one or more sensors, the sensor data comprising information about an object in the environment;
   determine a safety region proximate the vehicle;
   determine, from the sensor data, a distance of the object from the vehicle;
   determine, based at least in part on the distance, that the object is in the safety region;
   determine, based at least in part on the object being in the safety region and the distance, a modified speed for the vehicle less than the commanded speed; and
   control the one or more drive systems to move the autonomous vehicle in the direction at the modified speed.

2. The vehicle of claim 1, wherein the safety region comprises:
   a first safety region extending a first distance in the direction of travel relative to the vehicle, and
   a second safety region extending a second distance in the direction of travel relative to the vehicle, wherein the second distance is greater than the first distance, and
   wherein the control system determines the modified speed for the vehicle to be zero when the distance indicates that the object is in the first safety region.

3. The vehicle of claim 2,
   wherein the control system determines the modified speed to be a non-zero speed that is less than the commanded speed when the distance indicates that the object is in the second safety region.

4. The vehicle of claim 3, wherein the modified speed is determined as at least one of a linear function or exponential function of the commanded speed, based on the distance.

5. The vehicle of claim 2, wherein the first safety region has a first width in a lateral direction and the second region has a second width in the lateral direction.

6. The vehicle of claim 5, wherein the one or more control commands further comprise a command for the vehicle to change the direction, and wherein the control system is further configured to alter at least one of the first width or the second width in response to the control command for the vehicle to change the direction.

7. The vehicle of claim 1, wherein:
   the source comprises a remote controller, and
   the remote controller is one of physically coupled to the vehicle or wirelessly connected using a short distance wireless protocol.

8. The vehicle of claim 7, wherein the control system is further configured to:
   authenticate the remote controller based at least in part on one or more of:
   establishing a connection with the remote controller;
   synchronizing the remote controller with the vehicle; or
   recognizing the controller using at least one of pattern recognition or code recognition.

9. The vehicle of claim 1, wherein:
   the distance is a first distance and the modified speed is a first modified speed and the first modified speed is non-zero; and
   the control system is further configured to:
   receive additional sensor data,
   determine, based at least in part on the additional sensor data, a second distance of the object from the vehicle,
   determine, based at least in part on the second object distance and the commanded speed, a second modified speed for the vehicle, the second modified speed being non-zero, and
   control the one or more drive systems to move the vehicle in the direction at the second modified speed.

10. A method of controlling a vehicle comprising:
    receiving, from a source proximate the vehicle, a control command for the vehicle to proceed in a direction at a commanded speed;
    determining a region proximate the vehicle;
    determining, from sensor data, a location of an object relative to the autonomous vehicle;
    determining that the object is in the region;
    determining, based at least in part on the object being in the region and the location, a modified speed for the vehicle different from the commanded speed; and
    controlling the vehicle to move in the direction at the modified speed.

11. The method of claim 10, wherein:
    the region proximate the vehicle comprises a safety zone extending a distance in the direction,
    the determining the location of the object comprises determining that the object is located in the first safety zone, and
    the determining the modified speed comprises determining that the speed is zero at least in part in response to determining that the object is located in the first safety zone.

12. The method of claim 10, wherein:
    the region proximate the vehicle comprises a first safety zone extending a first distance in the direction and a second safety zone extending from the first distance to a second distance in the direction,
    the determining the location of the object comprises determining that the object is located in the second safety zone, and
    the determining the modified speed comprises determining that the modified speed as a non-zero speed less than the commanded speed at least in part in response to determining that the object is located in the second safety zone.

13. The method of claim 10, further comprising:
    determining, from sensor data, a location of a person relative to the vehicle, wherein the control command is based at least in part on the location of the person.

14. The method of claim 13, wherein one of:
    the location of the person is in a first control region on a side of the vehicle opposite the direction; or
    the location of the person is outside of a second control region on a side of the vehicle in the direction.

15. The method of claim 13, wherein the source comprises a remote controller configured to receive manual inputs from the person, the method further comprising:

authenticating the remote controller at the vehicle, the authenticating comprising at least one of:
  establishing a connection with the remote controller;
  syncing the remote controller with the vehicle; or
  recognizing the controller using at least one of pattern recognition or code recognition.

16. An autonomous vehicle comprising:
one or more sensors configured to sense objects in an environment of the autonomous vehicle;
one or more drive systems configured to cause the autonomous vehicle to move in the environment; and
a control system configured to:
  receive a command from a remote controller in the environment proximate to the autonomous vehicle, the command configured to cause the vehicle to move in a direction at a speed;
  receive sensor data from the one or more sensors disposed on the autonomous vehicle, the sensor data comprising information about an object in the environment;
  determine a region proximate the autonomous vehicle;
  determine, based on the information, that the object is in the region;
  determine a distance of the object from the autonomous vehicle;
  determine a modified speed as a function of the speed and the distance; and
  control the one or more drive systems to move the autonomous vehicle at the modified speed,
  wherein the command, when executed by the autonomous vehicle, causes the autonomous vehicle to move into one or more of a parking spot, a charging location, or a service location.

17. The autonomous vehicle of claim 16, wherein the source comprises a remote controller, the control system further configured to:
  determine whether the distance is less than or equal to a threshold distance; and
  determine an altered control command including the modified speed based on determining the distance is less than or equal to the threshold distance; and
  control the vehicle based at least in part on the altered control command.

18. The autonomous vehicle of claim 17, wherein the modified speed is a reduced speed and the reduced speed is determined as a linear function of the distance.

19. The autonomous vehicle of claim 16, wherein the source is a person, the control system further configured to:
  generate the command based on a position of the person, the command configured to control the one or more drive systems to move the autonomous vehicle to position the autonomous vehicle at a predetermined distance relative to the person.

20. The autonomous vehicle of claim 19, wherein:
the command is a first command and the direction is a first direction,
the region extends a distance from the vehicle in the first direction and has a width, and
the control system is further configured to:
  receive a second command to cause the vehicle to move in a second direction, and
  alter at least one of the distance or the width of the region based at least in part on the second command.

* * * * *